United States Patent [19]

Dobson et al.

[11] 4,392,988

[45] Jul. 12, 1983

[54] METHOD OF PRODUCING STABLE ALUMINA

[75] Inventors: Jesse C. Dobson, La Jolla; Richard W. Knight, Jr., Escondido, both of Calif.

[73] Assignee: GA Technologies Inc., San Diego, Calif.

[21] Appl. No.: 262,230

[22] Filed: May 11, 1981

[51] Int. Cl.³ .......................... B01J 21/12; B01J 20/08
[52] U.S. Cl. ................................................. 252/455 R
[58] Field of Search ........................... 252/455 R, 463; 106/286.1, 287.17

[56] References Cited

U.S. PATENT DOCUMENTS

| | | | |
|---|---|---|---|
| 2,480,520 | 8/1949 | Thacker | 252/463 |
| 2,641,044 | 6/1953 | Bearer | 106/287.17 |
| 2,645,588 | 7/1953 | Barry | 106/287.17 |
| 2,886,460 | 5/1959 | Alexander et al. | 106/287.17 |
| 2,891,875 | 6/1959 | Phreaner | 106/287.17 |
| 2,988,520 | 6/1961 | Braithwaite | 252/455 R |
| 3,183,194 | 5/1965 | Kuwata et al. | 252/317 |
| 3,558,508 | 1/1971 | Keith et al. | 252/317 |
| 3,980,586 | 9/1976 | Mitchell | 252/455 R |
| 3,983,055 | 9/1976 | Mitchell et al. | 252/455 R |

OTHER PUBLICATIONS

Yoldas et al., Ceramic Bulletin, vol. 59, No. 4 (1980), pp. 479-483.

Primary Examiner—Carl F. Dees
Attorney, Agent, or Firm—Fitch, Even, Tabin & Flannery

[57] ABSTRACT

Microspheres of activated alumina are thermally and chemically stabilized by soaking the spheres in silicone liquid and decomposing the silicone liquid in an inert atmosphere to leave a silica residue infused in the alumina crystal structure resulting in a silica-alumina phase over the internal and external structure of the alumina. The treated microspheres are then heated in the presence of oxygen to burn off residual carbon resulting from the decomposition of the silicone liquid.

10 Claims, 1 Drawing Figure

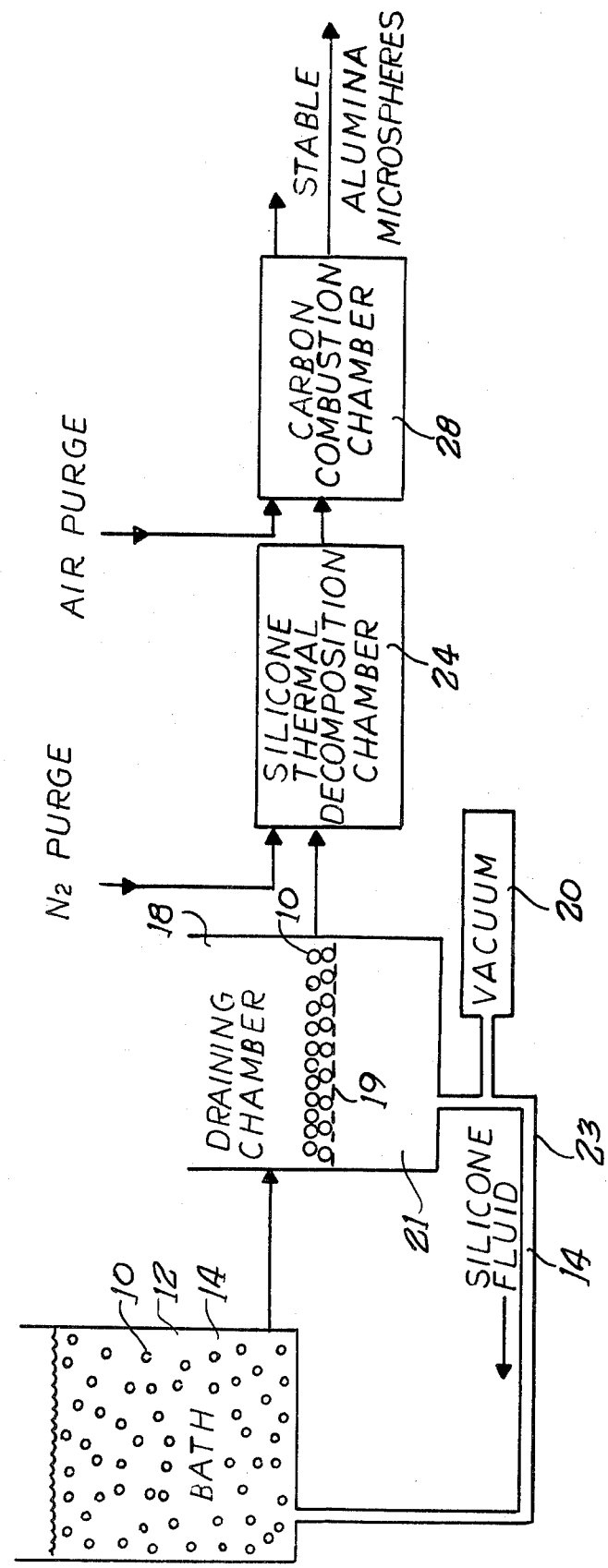

METHOD OF PRODUCING STABLE ALUMINA

The present invention relates to methods of stabilizing low-density crush-resistant alumina and more particularly to methods of stabilizing alumina microspheres through infusion with silica.

BACKGROUND OF THE INVENTION

Alumina microspheres are produced according to various sol-gel techniques which generally involve creating an alumina hydrosol, e.g. by the action of dilute acetic acid on aluminum metal, and dispersing droplets of the gel into a water-immiscible solvent where the surface tension of the droplets draws the droplets into a sphere. The spheres of alumina hydrosol are congealed, e.g., by introducing the hydrogel spheres into ammonium hydroxide, and dried. The dried microspheres are calcined to split water molecules from the hydrated aluminum oxide and leave solid microspheres of alumina. When calcined at temperatures between about 400° C. to about 1000° C., the resulting microspheres are composed of activated alumina having very small crystallite size, high porosity and high surface area. As used herein, the term "activated alumina" encompasses alumina of a variety of crystallite structures having high porosity resulting in a surface area of at least about 125 $m^2/g$. (The term "surface", as used herein in reference to the activated alumina, includes the surfaces of the interior pores as well as the exterior surfaces of the alumina). Activated alumina may take several crystallite forms including delta, gamma, kappa and, most commonly, theta alumina. For purposes of this invention, activated alumina having a crush strength of at least about 25 Kpsi is of primary interest. Porous activated alumina is highly hygroscopic and is commonly used as a highly effective desiccant.

Porous activated alumina has a low density and is quite resilient resulting in a high crush strength, i.e., as high as 45 Kpsi at a density of 1.4 $g/cm^3$. Their low density and high resiliency suggest the use of activated alumina microspheres for such applications as proppants for gas well fracturing, catalyst support, granular bed filtration, heat transfer media, etc. However, activated alumina is a relatively unstable form of alumina which may be degraded by contact with moisture, even water vapor in the air, and by elevated temperatures. Activated alumina microspheres exposed to the atmosphere at 20° C. and at 50% relative humidity for 24 hours will absorb sufficient moisture to reduce its crush strength from 30 Kpsi to 12 Kpsi. At temperatures over 1100° C., activated alumina is converted to $\alpha$-alumina which is less resilient than activated alumina and has very little crush strength. For example, $\theta$-alumina microspheres with a crush strength of 27 Kpsi heated at 1200° C. for 30 minutes are converted to a $\alpha$-alumina with a crush strength of less than 2 Kpsi. Accordingly, raw activated alumina is unsuitable for many purposes which involve the presence of water or water vapor and has limited use as a refractory material.

It would be desirable to have a method of treating activated alumina, particularly activated alumina microspheres, to waterproof the alumina and to increase its thermal stability while retaining the desirable properties of low-density, and high crush strength. In particular, it would be desirable to prevent the conversion of activated alumina to low porosity, low crush strength $\alpha$-alumina.

SUMMARY OF THE INVENTION

Aluminum oxide microspheres which have been calcined at temperatures between about 400° C. and about 1000° C. to create activated alumina are soaked in a silicone liquid to impregnate the microspheres therewith and drained of excess silicone liquid. The impregnated microspheres are heated above 350° C. and preferably above 600° C. under an inert atmosphere to decompose the silicone liquid leaving a silica residue infused in the alumina crystal structure, the exterior and interior structure of the alumina forming a silica-alumina phase which protects the alumina against attack by water. The treated alumina microspheres are then heated in an oxygen-containing atmosphere to burn off any residual carbon. At temperatures above about 1100° C., the normal conversion temperature of activated alumina to $\alpha$-alumina, the conversion of the remaining activated alumina to $\alpha$-alumina is retarded, and the loss of crush strength of the microspheres is reduced thereby increasing their usefulness as a refractory or heat transfer material.

BRIEF DESCRIPTION OF THE DRAWING

The FIGURE is a flow sheet for an activated alumina-stabilizing method embodying various features of the present invention.

DETAILED DESCRIPTION OF THE PREFERRED EMBODIMENT

In accordance with the present invention, activated alumina, particularly particulate alumina and more particularly activated alumina in the form of alumina microspheres, is waterproofed and given resistance to $\alpha$-phase thermal conversion by infusing and coating the alumina with silica. (Herein, "particulate alumina" is used to designate alumina fragments having a maximum dimension less than about 5 mm.) The microspheres are soaked in silicone liquid to impregnate the microspheres therewith and heated under an inert atmosphere to decompose the silicone and leave a silica residue infused into the alumina crystal structure forming a silica-alumina phase over the internal and external crystallite structure. Thereafter, the microspheres are heated in an oxidizing atmosphere to burn off residual carbon.

The alumina microspheres are prepared by known sol-gel techniques, such as that described in U.S. Pat. No. 2,492,167, and calcined at temperatures of between about 400° C. and about 1000° and preferably below about 800° C. to convert the hydrated alumina, derived from the sol-gel, to microspheres of predominantly activated alumina. Driving off the water from the gel microspheres, which originally contain only between about 10 to about 20% alumina, leaves large voids in the microspheres structure resulting in low density and high surface area. Typically, the activated alumina microspheres will have an initial crush strength of between about 25 and about 45 Kpsi, a density of between about 1.2 and about 1.8 $gm/cm^3$ and a surface area of about 300 $m^2/gm$.

In reference to the flow sheet in the FIGURE, the activated alumina microspheres 10 are soaked in a bath 12 of silicone liquid 14 which covers the alumina microspheres. It is found that, to insure full waterproofing of the microspheres 10, it is necessary to use a silicone liquid having a viscosity greater than about 200 centistokes (cst) at 25° C. To allow adequate penetration of the viscous fluid into the pores of the alumina in a reasonable amount of time, the silicone liquid is heated to at least about 150° C. to reduce its viscosity to below about 20 cst. but not above about 225° C. so that the silicone will neither decompose nor burn. The slurry of alumina microspheres 10 in silicone is stirred while heating to prevent the microspheres from sticking together.

For microspheres under about 1.0 mm. in diameter, stirring a slurry of silicone liquid at 150° C. for fifteen minutes is enough time for sufficient silicone liquid to seep into the pores of the microspheres for complete waterproofing. Thereafter, the slurry is cooled to below about 50° C. and the now viscous liquid is retained in the pores and on the microsphere surfaces.

The preferred silicone liquid for impregnating the microspheres is polydimethylsiloxane. However, silicone liquids consisting of other organopolysiloxanes and mixtures thereof may be used, provided that the liquid has the requisite viscosity and the organopolysiloxanes decompose above the temperature range useful for impregnating the microspheres and well below the conversion temperature of activated alumina into $\alpha$-alumina. Suitable silicone liquids for waterproofing alumina include but are not limited to polysiloxanes having the general formula:

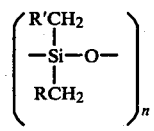

where R and R' are selected from groups consisting of hydrogen, alkyl, aryl, alkyloxy and aryloxy.

The slurry of alumina microspheres in silicone liquid is introduced into a draining chamber 18 having a screen 19 of suitable mesh through which excess silicone liquid is drained from the microspheres. The portion 21 of the draining chamber below the mesh is connected to a source of vacuum 20 to hasten the draining of the slurry and assure substantially complete draining of excess silicone liquid. The drained silicone liquid may be recovered and conducted through a conduit 23 back to the soaking bath 14.

After the excess silicone has been drained, the silicone-coated and impregnated microspheres are transferred into a heating chamber 24 which is purged with an inert gas, e.g. nitrogen. The temperature in the heating chamber 24 is increased gradually from room temperature to above the decomposition temperature of the silicone liquid. Decomposition of polydimethylsiloxane begins to occur at about 350° C., and it is preferred that the temperature be raised to above 600° C. to insure rapid and complete decomposition of the silicone liquid. The inert atmosphere is used to prevent combustion of the polydimethylsiloxane which would burn violently at about 450° C. in the presence of oxygen. In a typical procedure, the silicone-impregnated microspheres are heated from about 25° C. to about 600° C. during a two hour period and maintained at 600° C. for an additional hour. X-ray crystallography indicates that the major portion of the residual silica is infused into the crystalline structure forming the apparently amorphous silica-alumina phase which waterproofs the alumina and retards the thermal conversion of the remaining activated alumina. It is believed that this amorphous silica-alumina stage may actually be mullite, an interstatial crystallite structure with the formula ($3Al_2O_3.2SiO_2$), with extremely small crystallite size.

The treated microspheres are relatively chemically inert and waterproofed. The resistance to attack by water and other chemicals appears to result from the formation of the water-resistant silica-alumina phase over the internal and external structure of the alumina. Because the treated microspheres retain a high degree of pososity and large surface area, the chemical and water resistant characteristics cannot be the result of an impermeable exterior shell being formed around the microspheres that would prevent access of liquid into the pores.

In addition to the silica-alumina phase, the anaerobic decomposition of silicone liquid leaves a carbon residue. The carbon is burned off from the stabilized microspheres in a second heating chamber 28 which is purged by an atmosphere having at least about 10% oxygen. The chamber 28 is maintained at a temperature between about 500° C. and about 800° C. Typically the microspheres will be heated in the presence of air for about one hour at 650° C. The silica-treated microspheres, which are substantially free of carbon, retain their waterproof and chemically resistant properties.

The microspheres, which have been coated by silicone impregnation and decomposition to silica, generally contain between about 7 to about 15% silica. The density is increased between about 20 to about 30%, e.g. from 1.4 to 1.7 gm/cm$^3$, and the surface area of the microspheres is decreased, e.g. from about 300 m$^2$/g to about 130 m$^2$/g. The crush strength of the treated microspheres is increased by as much as about 25%.

In addition to stabilizing the alumina against attack by water and other chemicals, the treated microspheres retain significant portions of their crush strength at temperatures well above the normal phase conversion temperature of raw activated alumina. The treated microspheres retain about one-half their original crush strength at 1300° C. while raw alumina microspheres are completely converted to low crush strength $\alpha$-alumina at 1200° C.

When heated to temperatures above 1000° C., X-ray crystallography indicates increasingly defined mullite structure. As determined by X-ray crystallography, treated microspheres heated to 1300° contain activated alumina, $\alpha$-alumina and mullite. It appears, therefore, that the retained crush strength of the treated microspheres heated to elevated temperatures is a result of a delayed conversion of activated alumina to $\alpha$-alumina as well as the presence of mullite which is itself a very crush resistant species. It should be noted that particles of mullite produced by conventional methods would not have the porosity, high surface area and low density of the treated alumina herein described.

Because of their high crush strength, the treated microspheres are useful as gas well fracturing proppants and in other applications where crush-resistant material is required. The waterproofed microspheres may be used in the presence of water in granular bed filtration and as catalyst supports in aqueous systems. The treatment increases the usefulness of the microspheres as refractory material.

EXAMPLE

Activated alumina ($\theta$-phase) microspheres having an average diameter of 700 $\mu$m, a maximum diameter of 1000 $\mu$m, a density of 1.4 gm/cm$^3$ and a crush strength of 29 Kpsi are covered with polymerized polydimethylsiloxane having a viscosity of 350 cst at 25° C. The resulting slurry is stirred and heated to 150° C. and maintained thereat for a period of 30 minutes. The heated slurry is allowed to cool to room temperature below 25° C. and the slurry is drained of excess silicone liquid on a 400 μm screen to which a vacuum of 2.0 psi is applied.

The silicone-soaked microspheres are transferred to a chamber which is purged with nitrogen and brought up to a temperature of 600° C. over a two hour period. The temperature is maintained at 600° C. for an hour, and the chamber and microspheres are allowed to cool to room temperature. Thereafter, the microspheres are transferred to a second chamber through which dried air is passed, and the microspheres are heated therein at 650° C. for one hour.

The resulting microspheres contain 89% by weight alumina and 11% by weight silica. The density of the microspheres is 1.79/cm$^3$, and the spheres have a crush strength of 35 Kpsi.

A portion of the coated microspheres is covered by a 2% aqueous KCl solution and boiled therein for a period of fourteen days. The microspheres are washed in distilled water and dried. No detectable change results in appearance, density or crush strength of the microspheres.

A second portion of the coated microspheres is heated to 1300° C. for a period of one hour. The microspheres retain a crush strength of 19 Kpsi.

The above example illustrates that activated alumina coated by the impregnation and decomposition of silicone liquid to silica may be fully waterproofed and rendered resistant to chemical attack. Further, the coated alumina microspheres retain significant crush strength at temperatures at which raw activated alumina is fully converted to low crush strength α-alumina. Of course, the degree of waterproofing and heat stability depends on the initial crystallite structure of the activated alumina and the precise coating conditions.

While the invention has been described in terms of a certain preferred embodiment, modifications obvious to one with ordinary skill in the art may be made without departing from the scope of the invention. The process of coating activated alumina is not limited to microspheres, and activated alumina of any shape may be stabilized by the methods described herein. Small particles of alumina, created by fracturing larger alumina pieces and coated with silica, may be substituted for microspheres in many applications. Large particles or masses of activated alumina may be similarly treated provided that they are soaked in silicone liquid for sufficient time to fully impregnate the porous alumina.

Various features of the invention are set forth in the following claims.

What is claimed:

1. A method of treating activated alumina to impart increased chemical stability and heat resistance thereto comprising
   soaking activated alumina in silicone liquid to impregnate said activated alumina therewith,
   draining excess silicone liquid from said activated alumina, and
   heating said silicone liquid impregnated activated alumina in an oxygen-free atmosphere to between about 350° C. and about 1100° C. to leave a silica residue infused in the crystallite structure resulting in a silica-alumina phase over the internal and external structure of said alumina.

2. A method according to claim 1 in which said activated alumina having said silica residue is further heated in the presence of oxygen to burn off carbon residue at a temperature below the α-phase conversion temperature of activated alumina.

3. A method according to claim 1 in which said activated alumina is provided by preparing hydrated alumina gel microspheres and calcining said gel microspheres at temperatures of between about 400° C. and about 1000° C. to drive water from said hydrated gel microspheres and convert the same to activated alumina microspheres.

4. A method according to claim 1 in which said silicone liquid is polydimethylsiloxane.

5. A method according to claim 1 wherein said silicone liquid is selected from polysiloxanes and mixtures thereof having the general formula:

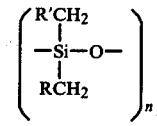

where R and R' are selected from groups consisting of hydrogen, alkyl, aryl, alkyloxy, and aryloxy.

6. A method according to claim 1 wherein said silicone liquid has a viscosity at least about 200 cst at 25° C.

7. A method according to claim 3 wherein said activated alumina microspheres are selected having a maximum diameter of about 1 mm, said silicone liquid is selected having a viscosity of at least about 200 cst at 25° C., and said selected microspheres are soaked for at least about 15 minutes in said silicone liquid heated to between about 150° C. and about 225° C. to reduce its viscosity to below about 20 cst.

8. A method according to claim 1 wherein said silicone liquid-impregnated alumina is heated to at least about 350° C. to decompose said silicone liquid.

9. A method according to claim 1 wherein said silicone liquid-impregnated alumina is heated to at least about 600° C. to decompose said silicone liquid.

10. A method according to claim 2 wherein said activated alumina having said silica residue is heated in an atmosphere having at least about 10% oxygen at a temperature of at least about 600° C.

* * * * *